(12) United States Patent
Hess et al.

(10) Patent No.: US 9,816,566 B2
(45) Date of Patent: Nov. 14, 2017

(54) SEAL AND CROSS MEMBER UNIT FOR UNIVERSAL JOINTS

(71) Applicant: Spicer Gelenkwellenbau GmbH, Essen (DE)

(72) Inventors: Tobias Hess, Essen (DE); Thomas Stein, Essen (DE); Stefan Buervenich, Gladbeck (DE)

(73) Assignee: Spicer Gelenkwellenbau GmbH, Essen (DE)

( * ) Notice: Subject to any disclaimer, the term of this patent is extended or adjusted under 35 U.S.C. 154(b) by 0 days.

(21) Appl. No.: 15/126,328

(22) PCT Filed: Feb. 10, 2015

(86) PCT No.: PCT/EP2015/052796
§ 371 (c)(1),
(2) Date: Sep. 15, 2016

(87) PCT Pub. No.: WO2015/139886
PCT Pub. Date: Sep. 24, 2015

(65) Prior Publication Data
US 2017/0082153 A1   Mar. 23, 2017

(30) Foreign Application Priority Data

Mar. 17, 2014   (EP) .................................... 14160182

(51) Int. Cl.
*F16C 33/78* (2006.01)
*F16D 3/41* (2006.01)
(Continued)

(52) U.S. Cl.
CPC ............ *F16D 3/385* (2013.01); *F16C 21/005* (2013.01); *F16C 33/783* (2013.01);
(Continued)

(58) Field of Classification Search
CPC ........ F16C 19/04; F16C 25/08; F16C 33/768; F16C 33/7809; F16C 33/783;
(Continued)

(56) References Cited

U.S. PATENT DOCUMENTS 2,402,114 A    6/1946   Le Clair
2,637,606 A *  5/1953   Pielop, Jr. ............. F04B 53/143
                                                    277/438

(Continued)

FOREIGN PATENT DOCUMENTS

DE    3639315 C1    4/1988
DE    8805833 U1    7/1988
(Continued)

OTHER PUBLICATIONS

International Search Report and Written Opinion for Application No. PCT/EP2015/052796, dated Apr. 15, 2015.

(Continued)

*Primary Examiner* — Josh Skroupa
(74) *Attorney, Agent, or Firm* — Marshall & Melhorn, LLC

(57) ABSTRACT

A seal for a cross member unit for universal joints has a carrier ring to be inserted into a bearing cup of the cross member unit. The carrier ring has an L-shaped cross section with a cylindrical portion coaxial to a longitudinal axis and a flange portion extending form the cylindrical portion inwardly. An elastomeric sealing lip element is connected to the carrier ring. The sealing lip element has first engagement elements form fittingly engaging into first engagement apertures. The first engagement apertures extend through the flange portion of the carrier ring. The sealing lip element further has second engagement elements form fittingly (Continued)

engaging into second engagement apertures. The second engagement apertures extend through the cylindrical portion of the carrier ring.

14 Claims, 3 Drawing Sheets

(51) Int. Cl.
*F16D 3/38* (2006.01)
*F16J 15/3268* (2016.01)
*F16J 15/3276* (2016.01)
*F16C 21/00* (2006.01)

(52) U.S. Cl.
CPC ...... *F16C 33/7809* (2013.01); *F16C 33/7876* (2013.01); *F16D 3/41* (2013.01); *F16J 15/3268* (2013.01); *F16J 15/3276* (2013.01); *F16C 2326/06* (2013.01); *F16C 2361/41* (2013.01); *F16D 2300/08* (2013.01); *Y10S 464/905* (2013.01)

(58) Field of Classification Search
CPC .............. F16C 33/7869; F16C 33/7876; F16C 33/7883; F16C 2326/06; F16D 3/385; F16D 3/41; F16D 2300/08; F16J 15/3204; F16J 15/3232; F16J 15/3252; F16J 15/3256; F16J 15/3268
USPC .......................................... 464/130–133, 905
See application file for complete search history.

(56) References Cited

U.S. PATENT DOCUMENTS

| | | | | |
|---|---|---|---|---|
| 2,755,113 A * | 7/1956 | Baumheckel | ......... | F16C 33/783 277/369 |
| 3,114,559 A * | 12/1963 | Miglietti | ............. | F16C 33/7853 277/376 |
| 3,331,611 A * | 7/1967 | Liebig | .................. | F16J 15/3272 277/546 |
| 3,822,890 A * | 7/1974 | Bourgeois | ............ | F16J 15/3232 277/348 |
| 3,980,309 A * | 9/1976 | Dechavanne | ........ | F16J 15/3268 277/503 |
| 4,053,166 A * | 10/1977 | Domkowski | ........ | F16J 15/3208 277/558 |
| 4,834,691 A | 5/1989 | Schultze et al. | | |
| 5,026,324 A | 6/1991 | Schurger et al. | | |
| 5,183,271 A * | 2/1993 | Wada | ..................... | F16J 15/328 277/351 |
| 5,380,015 A * | 1/1995 | Laflin | .................... | F16J 15/164 277/570 |
| 5,597,356 A | 1/1997 | Rieder | | |
| 6,786,489 B1 * | 9/2004 | Hennemann | .............. | B60T 8/38 277/437 |
| 2010/0109260 A1 * | 5/2010 | Mellander | .............. | F16J 15/061 277/619 |

FOREIGN PATENT DOCUMENTS

| | | | | |
|---|---|---|---|---|
| DE | 3824212 A1 | 1/1990 | | |
| DE | 4412132 A1 | 10/1995 | | |
| EP | 0321076 A1 | 6/1989 | | |
| EP | 0321200 A2 * | 6/1989 | .......... | F16J 15/3204 |
| FR | 1581126 A * | 9/1969 | ........... | F16C 33/783 |
| FR | 2568330 A1 | 1/1986 | | |
| GB | 1210191 A | 10/1970 | | |
| JP | S50-29955 A | 3/1975 | | |
| JP | H06-6832 U | 1/1994 | | |
| JP | 2000-104526 A | 4/2000 | | |
| WO | 2009106254 A1 | 9/2009 | | |

OTHER PUBLICATIONS

Japanese Patent Office Notification of Reasons for Refusal for JP Pat. Appl. No. 2016-558022, dated Apr. 3, 2017.
English-language translation of portions of JP 2000-104526 A.
English-language Abstract of JP 2000-104526 A.
English-language translation of portions of JP H06-6832.

* cited by examiner

SEAL AND CROSS MEMBER UNIT FOR UNIVERSAL JOINTS

BACKGROUND

This invention relates to a seal for a cross member unit for universal joints, comprising a carrier ring to be inserted into a bearing cup of the cross member unit, said carrier ring having an L-shaped cross section with a cylindrical portion coaxial to a longitudinal axis and a flange portion extending form the cylindrical portion inwardly, and an elastomeric sealing lip element connected to the carrier ring, wherein said sealing lip element having first engagement elements form fittingly engaging into first engagement apertures, said first engagement apertures extending through said flange portion of the carrier ring.

BRIEF SUMMARY

Universal joints are structures which are well known in the art. Such joints usually include a cross member having a central body portion with four trunnions extending outwardly therefrom. The trunnions extend at right angles relative to one another and lie in a single plane. A hollow cylindrical bearing cup, closed at one end, is disposed over the end of each of the trunnions. Lubricated roller bearings are provided between each of the bearing cups and its associated trunnion such that the bearing cups are rotatably mounted thereon.

It is known to provide the open ends of the bearing cups with elastomeric seals. The elastomeric seal is typically positioned between the trunnion and bearing cup to form a seal therebetween. To provide an effective seal, such seals must resist the entry of contaminants into the bearing cup and restrict the flow of lubricant out of the region of the bearing cup where the roller bearings are located. One commonly known seal, the lip seal, can accomplish both tasks. The lip seal includes an annular body which seals against a first surface of the universal joint assembly and one or more annular lips extending from the body to contact a second surface to be sealed. A conventional lip seal has two lips. A first lip is provided to prevent the flow of lubricant out of the interior of the bearing cup where the roller bearings are located. A second lip is provided to resist the entry of exterior contaminants into that same interior region of the bearing cup.

A seal having a carrier ring to be inserted into a bearing cup of the cross member unit is known form GB 1 210 191 A. Said carrier ring has an L-shaped cross section with a cylindrical portion coaxial to a longitudinal axis and a flange portion extending form the cylindrical portion inwardly. An elastomeric member is provided with projecting knobs extending into a series of corresponding holes in said flange portion of the carrier ring.

DE 36 39 315 C1 discloses a seal having a sleeve-shaped supporting ring having axial projections protruding into axially extending apertures of an elastomeric member.

A cross member unit is described in EP 03 21 076. Here, the main seal is fixed to the inner face of the bearing cup by means of a metallic carrier ring. The seal has two sealing lips. One lip sealingly rests against a cylindrical sealing face of the cross member trunnion. The other lip rests against a conically extending sealing face of the cross member trunnion. Furthermore, a preseal is provided in the form of an angle ring arranged on a cylindrical face of the trunnion. The cylindrical face adjoins the sealing face for the sealing lips of the main seal. The preseal extends over the outer face of the bearing cup by means of a leg which extends parallel to the inner face of the bearing cup. Together with an inwardly directed bead engaging a groove in the outer face of the bearing bush, the preseal forms a labyrinth seal.

An improved embodiment of such sealing assemblies with a main seal and preseal for relubricatable cross member units is described in DE 88 05 833 U1. Here, the main seal is firmly inserted into the bearing cup and is provided with two sealing lips. The lips seal a cylindrical sealing face of the trunnion. The preseal is arranged, via an annular portion, on a cylindrical portion of the cross member. The cylindrical portion constitutes an extension of the sealing face for the sealing lips of the main seal. The preseal is supported on a curved face, if viewed in the axial direction of the arm. Furthermore, starting from said first leg used for fixing the preseal on the arm, the preseal includes a second leg which is arranged at a radial distance, with reference to the longitudinal axis, and is connected to the first leg by a web. Also, the second leg externally extends over the bearing bush.

In accordance with the invention a seal for a cross member unit for universal joints is provides having a carrier ring to be inserted into a bearing cup of the cross member unit, said carrier ring having an L-shaped cross section with a cylindrical portion coaxial to a longitudinal axis and a flange portion extending form the cylindrical portion inwardly. The seal further comprises an elastomeric sealing lip element connected to the carrier ring, wherein said sealing lip element having first engagement elements form fittingly engaging into first engagement apertures, said first engagement apertures extending through said flange portion of the carrier ring. The sealing lip element further has second engagement elements form fittingly engaging into second engagement apertures, said second engagement apertures extending through said cylindrical portion of the carrier ring.

The form fitting engagement between the sealing lip element and the carrier ring provides for a better and more secure connection between the carrier ring and the sealing lip element. This enhancement of the connection is further increased by the fact that engagements are provided in to different directions, i.e. in a substantially axial direction of the first engagement and in a substantially radial direction of the second engagement.

This kind of engagement is of particular importance for embodiments in which the carrier ring is made of a plastic material, in particular of a thermoplastic material, such as for instance polyamide (e.g. PA 6.6), and the sealing lip element is made of an elastomer, in particular a synthetic elastomer, such as for instance fluororubber (FKM). Elastomer material has a low adhesive property to thermoplastic material so that the additional engagement elements within the engagement apertures are improving the connection between the elastomer sealing lip element and the thermoplastic carrier ring. The first engagement including the first engagement elements and the first engagement apertures provide for a resistance against separation of the sealing lip element form the carrier ring in an axial direction. The second engagement including the second engagement elements and the second engagement apertures provide for a resistance against separation of the sealing lip element form the carrier ring in a radial direction.

According to a preferred embodiment at least one of the first form fitting elements and second form fitting elements have a connection portion and an engagement portion, said engagement portion projecting from the connection portion in a direction transverse to the extension direction of the respective form fitting element. Preferably, all engagement portions of the first form fitting elements are formed identically and all engagement portions of the second form fitting elements are formed identically.

In particular, the connection portion is pin-shaped and the engagement portion has a greater diameter than the pin-shaped connection portion. The engagement apertures are formed intermateable to the engagement elements. The engagement apertures, hence, may have a undercut in the form of the connection portions.

According to one embodiment, each of the first engagement elements is arranged with one of the second engagement elements in pairs on one radial plane comprising the longitudinal axis.

At least two of the second engagement apertures may extend parallel to each other through the cylindrical portion. According to an embodiment four groups of three of said second engagement apertures are provided, the second engagement apertures of each group extending parallel to each other through the cylindrical portion of the carrier ring. Two of said groups are preferably arranged diametrically to each other. The carrier ring is injection molded. With an arrangement of some of the second engagement apertures parallel to each other it is easier to remove molding cores from the used molding tool and to remove the manufactured carrier ring from the molding tool.

The carrier ring may comprise a plurality of projections projecting from an outer circumference of the cylindrical portion. These projections realize a press fit of the carrier ring within the bearing cup of the cross member unit. In order to ensure a centered position of the carrier ring the projections are evenly distributed around the circumference.

According to a preferred embodiment each of the projections and at least one of a first engagement aperture and a second engagement aperture are commonly arranged on one radial plane comprising the longitudinal axis.

In order to facilitate the assembly of the carrier ring within the bearing cup, the projections have a slanted face towards the flange portion.

In accordance with the invention further a cross member unit for universal joints is provided comprising a seal according to the embodiments describe above. The cross member unit further comprises a cross member with a body portion having at least one trunnion extending outwardly from said body portion said trunnion including a sealing surface extending outwardly from said body portion and a bearing surface extending outwardly from said sealing surface. A bearing cup is provided having an open end, a closed end, and an inner bearing surface, said bearing cup being disposed about said trunnion such that said inner bearing surface of said bearing cup is disposed co-axially about said bearing surface of said trunnion defining a bearing region therebetween. A bearing is disposed within said bearing region for permitting rotation of said bearing cup relative to said trunnion, wherein the carrier ring of said seal is mounted in said bearing cup, the sealing lip element sealingly engaging said trunnion sealing surface.

BRIEF DESCRIPTION OF THE DRAWINGS

Various objects and advantages of this invention will become apparent to those skilled in the art from the following detailed description of the preferred embodiment, when read in light of the accompanying drawings.

DETAILED DESCRIPTION

Figure 1:
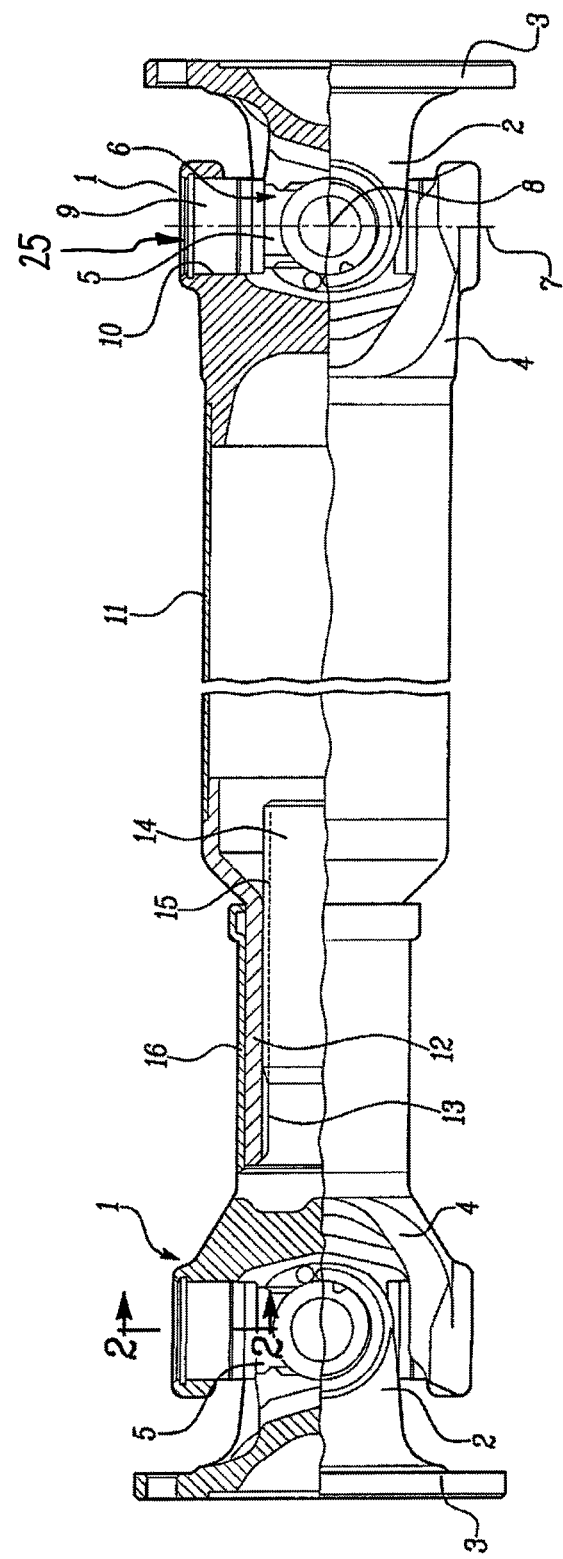
FIG. 1 is a half section of a side elevation view of a driveshaft provided with universal joints.

FIG. 1 shows a driveshaft with two universal joints 1, 1'. Each of the two universal joints 1, 1' include a first joint yoke 2 provided with a flange 3. A second joint yoke 4 is provided per universal joint 1, 1'. Both joint yokes 2, 4 are connected to one another by a cross member unit such that the first joint yoke 2 is able to carry out pivot movements around the longitudinal axis 8. The assembly, which includes the first joint yoke 2 and the cross member unit 5, is able to carry out a pivot movement around the second longitudinal axis 7 relative to the second joint yoke 4. The cross member unit 5 includes a cross member 6 with four trunnions 17. Each trunnion 17 includes a bearing assembly which includes a bearing cup 9 received in a yoke bore 10 of the respective joint yokes 2, 4.

A tube 11 is firmly connected to the second joint yoke 4 associated with the joint 1. The tube 11 carries the plunging sleeve 12. The plunging sleeve 12 has a central bore with splines 13. The splines' teeth extend parallel to the longitudinal axis and are worked into the wall of the central bore. A plunging journal 14, with outside splines 15, is longitudinally adjustably received in the sleeve central bore. The plunging journal 14 is firmly connected to the second joint yoke 4 of the universal joint 1'. The longitudinal plunging assembly, which includes the plunging journal 14 and the plunging sleeve 12, is able to accommodate changes in length which result from the change in the position of the universal-jointed shaft and from the articulation of the two universal joints 1, 1' relative to one another. The longitudinal plunging assembly is sealed by a protective tube 16. One end of the tube is secured to the second joint yoke 4 of the universal joint 1' and covers the outer face of the plunging sleeve 12. The other end of the protective tube 16 includes a seal which has a sealing function relative to the outer face. The two flanges 3 serve to be connected to a driving and driven part of the driveline into which the universal-jointed shaft is inserted.

Figure 2:
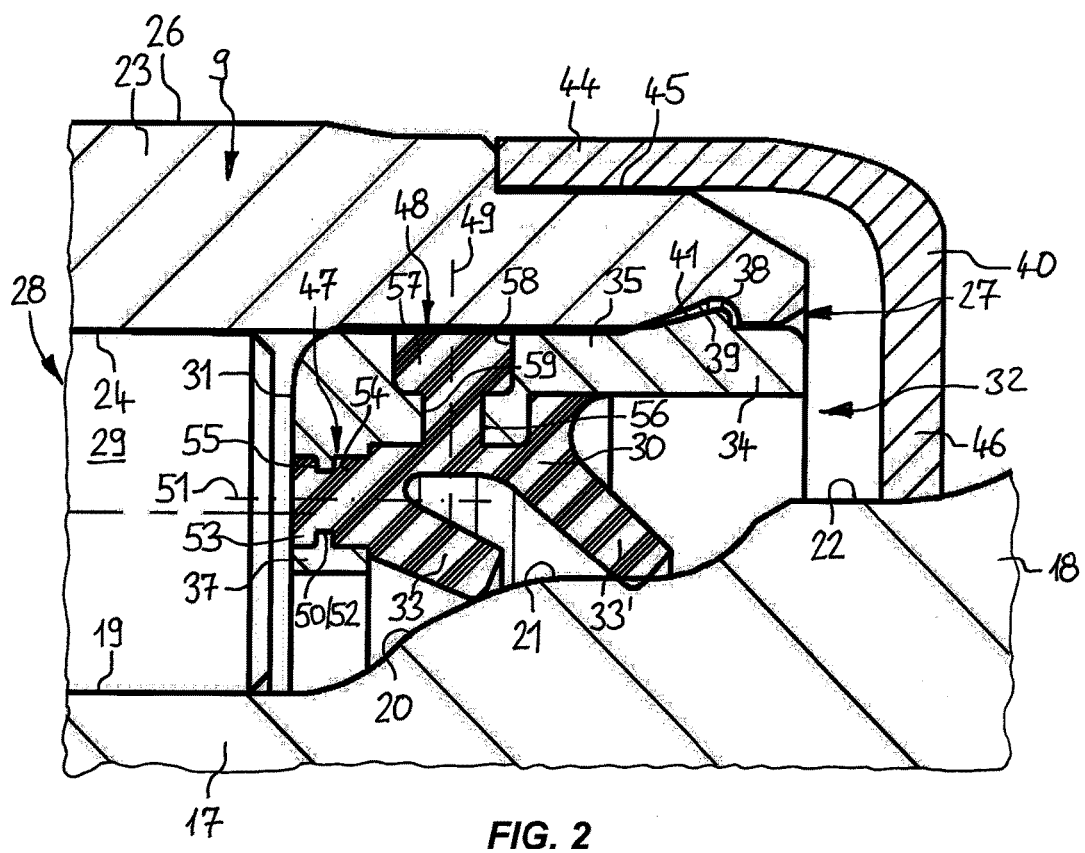
FIG. 2 is an enlarged cross-section view of a detail of the cross member unit in the area of the seal mounted to the sealing cup along the section line 2-2 according to FIG. 1.
Figure 3:
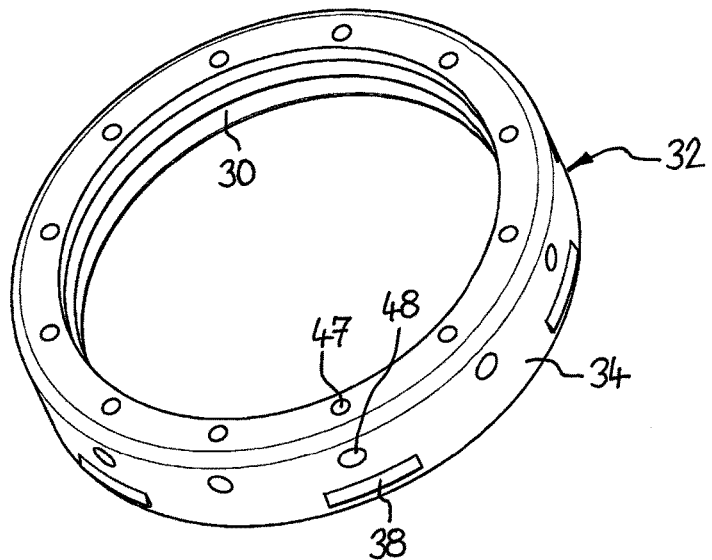
FIG. 3 is a perspective view of the seal.

FIG. 2 shows a detail of the cross member unit 5 in half section with the sectional plane including the longitudinal axis 7. Part of the cross member 6 with the trunnion 17 is visible. The trunnion 17 extends outwardly from a central body portion 18 of the cross member 6 and has a cylindrical bearing surface 19. The cylindrical bearing surface 19 extends from a shoulder 20 of the trunnion 17. The shoulder cross-section increases starting from the cylindrical bearing surface 19 towards the body portion 18. The shoulder 20 has the shape of a curve. The shoulder 20 is followed by a sealing surface 21. The sealing surface 21 includes a conical face and a cylindrical face with radius transitions. The sealing face 21, via a conical transition, is followed by a preseal sealing surface 22.

The bearing cup 9 with casing 23 includes a cylindrical inner bearing surface 24 and a cylindrical outer surface 26 arranged around the trunnion 17. The cylindrical outer face 26 serves to accommodate the bearing cup 9 in the yoke bore 10 of a joint yoke. Furthermore, the bearing cup 9 includes a base at a closed end 25 of the bearing cup 9.

Rolling members 29, in the form of needles or rollers, are arranged in the annular gap (bearing region 28) between the inner bearing surface 24 of the casing 23 of the bearing cup 9 and the bearing surface 19 of the trunnion 17. A seal 32 is mounted into the open end 27 of the bearing cup 9. The movement of the rolling members 29 parallel to the longitudinal axis 7 towards the body portion 18 is limited by a stop face 31 of the seal 32.

Along the longitudinal axis 7, the seal 32 includes two sealing lips 33, 33' arranged one behind the other. The sealing lips 33, 33' are part of a sealing lip element 30 which is connected to a carrier ring 34. The carrier ring 34 is mounted into the open end 27 with a press-fit while the sealing lips 33, 33' extend towards the sealing surface 21 of trunnion 17. The carrier ring 34 is preferably made of a thermoplastic material while the sealing lip element 30 is made of an elastomeric material.

The carrier ring 34 has an L-shaped cross section including a cylindrical portion 35 coaxially to the longitudinal axis 7 and a flange portion 37 which extends inwardly in the direction towards the longitudinal axis 7. The seal 32, via an outer face 36 of the carrier ring 34, is firmly received in the bearing cup 9.

The sealing lip element 30 is firmly connected to the carrier ring 34. The sealing lip element 30 comprises first engagement elements 47 and second engagement elements 48. The first engagement elements 47 extend along an axis of extension 51 parallel to the longitudinal axis 7 of the trunnion 17. The second engagement elements 48 extend in a direction transverse to the longitudinal axis 7. The axes 49 of extension of the second engagement elements 48 intersect the longitudinal axis 7 or cross the longitudinal axis 7 in a distance.

The first engagement elements 47 are pin-shaped with a circumferential groove 50 around the respective axis of extension 51 of the first engagement elements 47. Hence, in the region of the circumferential groove 50 the first engagement elements 47 have a pin-shaped connection portion 52 terminating into a head-like engagement portion 53 with greater diameter than the connection portion 52.

The first engagement elements 47 are received in first engagement apertures 54 of the carrier ring 34. The engagement apertures 54 are formed intermateable to the first engagement elements 47. Accordingly, the first engagement apertures 54 have the shape of a bore with a circumferential annular collar 55 which is form-fittingly received within the circumferential groove 50 of the respective first engagement element 47.

The second engagement elements 48 are also pin-shaped each with a pin-shaped connection portion 56 terminating into an engagement portion 57 having a greater diameter than the connection portion 56. The second engagement elements 48 are received within second engagement apertures 58 formed intermateable to the second engagement elements 48 being bore-like with a constriction 59 surrounding the connection portion 56 of the second engagement elements 48 and form fittingly engaging behind the engagement portion 57 of the second engagement elements 48.

Figure 4:
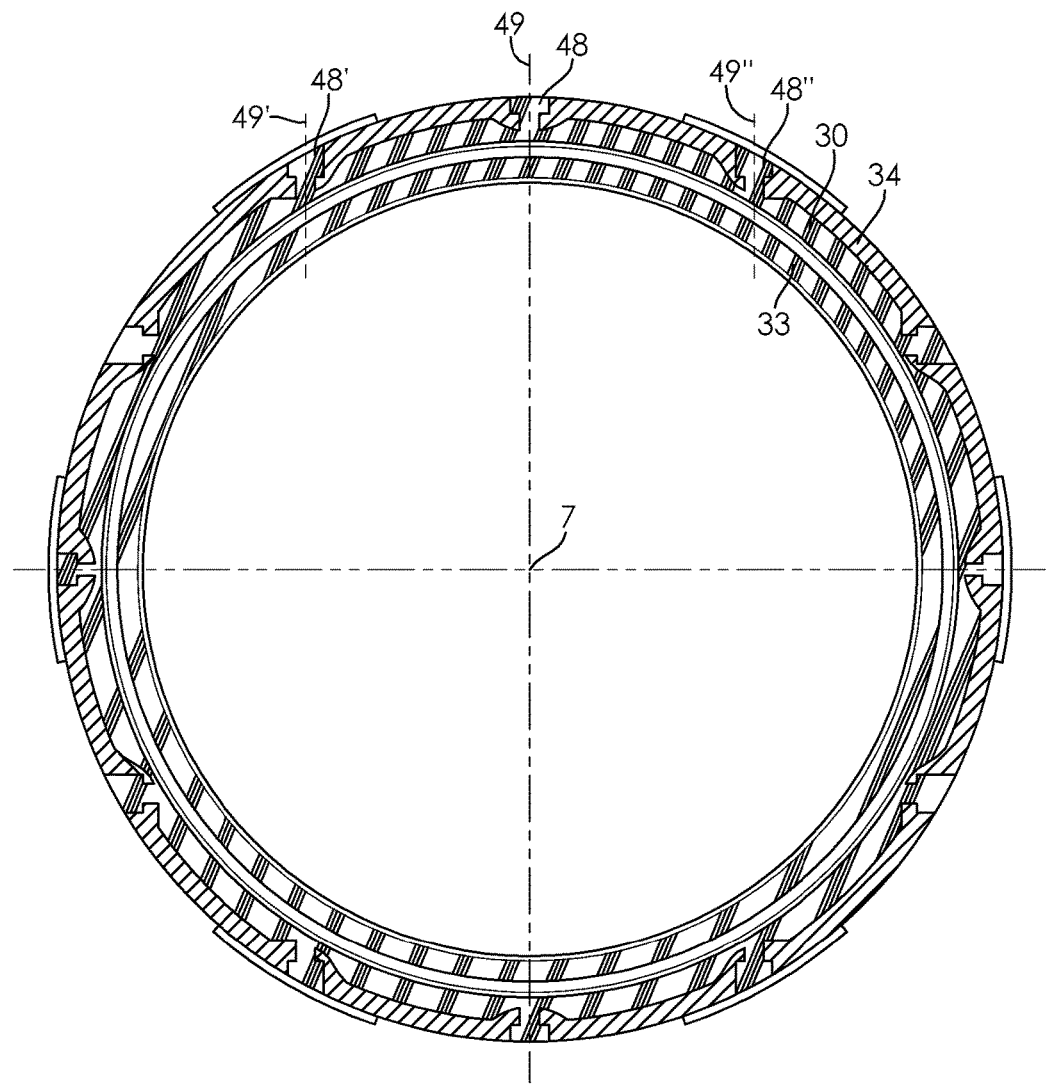
FIG. 4 a sectional view of the seal through the engagement elements.

As can be seen best in FIG. 4, being a cross sectional view perpendicular to the longitudinal axis 7 of the seal and the trunnion 17, the sealing lip element 30 is provided with twelve second engagement elements 48 and second engagement apertures 58. The second engagement elements 48 and second engagement apertures 58 can be constitute four groups. In each of the groups the second engagement elements 48 and second engagement apertures 58 extend parallel to each other. Each group is arranged diametrical to one of the other groups wherein one second engagement element 48 and one second engagement aperture 58 of one group are arranged on the same axis of extension 49 as one second engagement element 48 and one second engagement aperture 58 of the diametrical opposed group.

Each of the groups comprises one second engagement element 48 and one second engagement aperture 58 being radially orientated to the longitudinal axis 7 of the seal, i.e. the axis of extension 49', 49" of the second engagement element 48 intersects the longitudinal axis 7. Two second engagement elements 48 and two second engagement apertures 58 having an axis of extension 49', 49" crossing the longitudinal axis 7 of the seal with a distance.

The outer face 36 of the carrier ring 34 is provided with projections 38 evenly distributed about the circumference of the carrier ring 34 and projecting outwardly away from the longitudinal axis 7. The projections 38 engage into a circumferentially extending groove 39 in the inner face 24 of the bearing cup 9. Alternatively, the projections 38 may be replaced by one circumferential annular projection on the outer circumference of the carrier ring 34.

Each of the projections 38 has a slanted face 41 which faces towards the flange portion. While being inserted into the bearing cup 9 the open end 27 of the bearing cup 9 rides onto the slanted faces 41 of the projections 38 so that the cylindrical portion 35 of the carrier ring 34 is elastically deformed inwardly until the projections 38 reach the groove 39. When reaching the groove 39 the projections 38 snap back outwardly into the groove 39. The projections 38 each have a support face 42 which is orientated substantially radially, i.e. perpendicular to the longitudinal axis 7. The support face 42 is axially supported against a holding face 43 of the groove 39 holding the seal in the bearing cup 9 against moving the seal out of the bearing cup 9.

A preseal 40 is positioned on the front of the open end 27 of the bearing cup 9. The preseal 40 is seated with a connection portion 44 onto an outer connection portion 45 in the bearing cup 9. It will be appreciated that the preseal 40 can be connected to the bearing cup 9 in any know manner. The preseal 40 has a sealing portion 46 which surrounds the trunnion 17 leaving a narrow gap between the sealing portion 46 and the trunnion 17 forming a kind of labyrinth sealing. The sealing portion 46 could also be provided in the form of a sealing lip being in sealing contact to the trunnion 17.

REFERENCE SIGNS 1, 1' universal joint
2 joint yoke
3 flange
4 joint yoke
5 cross member unit
6 cross member
7 longitudinal axis
8 longitudinal axis
9 bearing cup
10 yoke bore
11 tube
12 plunging sleeve
13 splines
14 plunging journal
15 outside splines
16 protective tube
17 trunnion
18 body portion
19 bearing surface
20 shoulder
21 sealing surface 22 preseal sealing surface
23 casing
24 inner bearing surface
25 closed end
26 cylindrical outer surface
27 open end
28 bearing region
29 rolling member
30 sealing lip element
31 stop face
32 seal
33 sealing lip
34 carrier ring
35 cylindrical portion
36 outer face
37 flange portion
38 projection
39 groove
40 preseal
41 slanted face
42 support face
43 holding face
44 connection portion
45 outer connection portion
46 sealing portion
47 first engagement element
48 second engagement element
49, 49', 49" axis of extension of second engagement element
50 circumferential groove
51 axis of extension of first engagement element
52 connection portion of first engagement element
53 engagement portion of first engagement element
54 first engagement aperture
55 collar
56 connection portion of second engagement element
57 engagement portion of second engagement element
58 second engagement aperture
59 constriction

The invention claimed is:

1. A cross member unit for universal joints, comprising:
   a body portion having at least one trunnion extending outwardly from said body portion, said trunnion includes a sealing surface extending outwardly from said body portion and a bearing surface extending outwardly from said sealing surface, and
   a bearing cup having an open end, a closed end, and an inner bearing surface, said bearing cup being disposed about said trunnion such that said inner bearing surface of said bearing cup is disposed coaxially about said bearing surface of said trunnion defining a bearing region there between,
   a bearing with rolling members disposed within said bearing region for permitting rotation of said bearing cup relative to said trunnion, and
   a seal having a carrier ring and an elastomeric sealing lip element connected to the carrier ring, the carrier ring being mounted in said bearing cup, the sealing lip element sealingly engaging said trunnion sealing surface,
   said carrier ring having an L-shaped cross section with a cylindrical portion coaxial to a longitudinal axis and a flange portion extending from the cylindrical portion inwardly, said flange portion has a stop face limiting a movement of the rolling members in a direction parallel to the longitudinal axis,
   wherein said sealing lip element having first engagement elements form fittingly engaging into first engagement apertures, said first engagement apertures extending through said flange portion of the carrier ring wherein the sealing lip element has second engagement elements form fittingly engaging into second engagement apertures, said second engagement apertures extending through said cylindrical portion of the carrier ring.

2. The cross member unit according to claim 1, wherein the carrier ring is made of a plastic material, in particular of a thermoplastic material.

3. The cross member unit according to claim 1, wherein the sealing lip element is made of an elastomer, in particular a synthetic elastomer.

4. The cross member unit according to claim 1, wherein at least one of the first engagement elements and second engagement elements have a connection portion and an engagement portion, said engagement portion projecting from the connection portion in a direction transverse to the extension direction of the respective engagement element.

5. The cross member unit according to claim 4, wherein the connection portions are pin-shaped and the engagement portions have a greater diameter than the respective pin-shaped connection portion.

6. The cross member unit according to claim 5, wherein the first and second engagement apertures are formed intermateable to the first and second engagement elements, respectively.

7. The cross member unit according to claim 6, wherein each of the first engagement elements is arranged with one of the second engagement elements in pairs on one radial plane comprising the longitudinal axis.

8. The cross member unit according to claim 7, wherein at least two of the second engagement apertures extend parallel to each other through the cylindrical portion of the carrier ring.

9. The cross member unit according to claim 8, wherein four groups of three of said second engagement apertures are provided, the second engagement apertures of each group extending parallel to each other through the cylindrical portion of the carrier ring.

10. The cross member unit according to claim 9, wherein one of the second engagement apertures of each group is orientated radially to the longitudinal axis.

11. The cross member unit according to claim 1, wherein the carrier ring comprises a plurality of projections projecting from an outer circumference of the cylindrical portion.

12. The cross member unit according to claim 11, wherein the projections are evenly distributed around the circumference of the carrier ring.

13. The cross member unit according to claim 12, wherein each of the projections is arranged on a common radial plane comprising the longitudinal axis with one of the first engagement apertures and one of the second engagement apertures.

14. The cross member unit according to claim 13, wherein the projections have a slanted face towards the flange portion.

* * * * *